July 10, 1945.  D. SILVERMAN  2,379,996
TRANSMITTING SYSTEM
Filed April 29, 1942  2 Sheets-Sheet 1
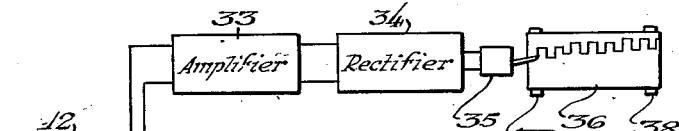
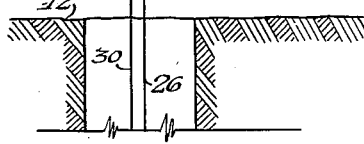
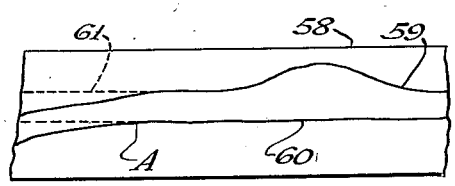
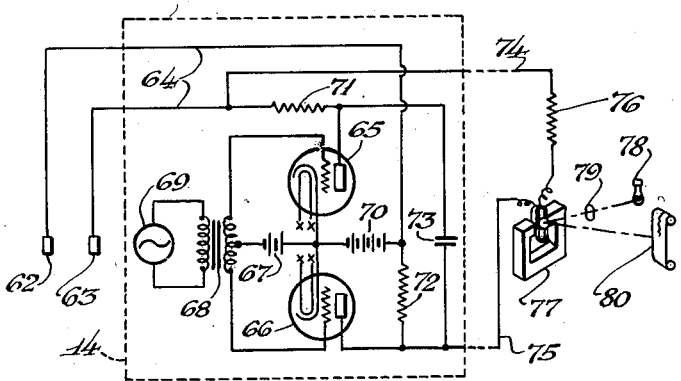
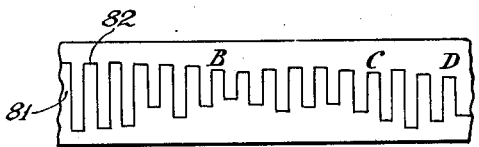
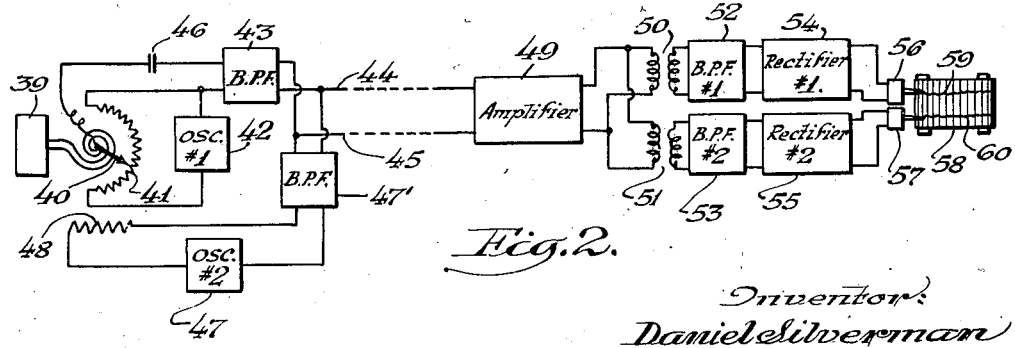
Inventor:
Daniel Silverman
By Paul F. Hawley
Patent Agent.

July 10, 1945.    D. SILVERMAN    2,379,996
TRANSMITTING SYSTEM
Filed April 29, 1942    2 Sheets-Sheet 2

Inventor:
Daniel Silverman
By Paul F Hawley
Patent Agent

Patented July 10, 1945

2,379,996

UNITED STATES PATENT OFFICE 2,379,996

TRANSMITTING SYSTEM

Daniel Silverman, Tulsa, Okla., assignor to Stanolind Oil and Gas Company, Tulsa, Okla., a corporation of Delaware Application April 29, 1942, Serial No. 441,046

2 Claims. (Cl. 177—351)

This invention pertains to the art of transmitting signals from one point to another and has particular application to an improved method of transmitting signals from a point in a well to the surface of the earth over a path the characteristics of which are either unknown or variable, without the transmission characteristics affecting the magnitude of the desired result. Although the invention is described herein in accordance with systems of well logging, it is to be understood that it can be used equally well in other applications whenever the problem encountered is analogous to that in the well.

The problem of transmitting information from a point in a deep bore hole or from a measuring instrument affixed near the lower end of a string of drill pipe is more difficult than corresponding telemetering operations at the surface of the earth. In the latter case a wide variation in types of conductors, spacing between conductors and cables can be provided which are reasonably free from disturbing effects, particularly leakage. In the case of transmitting signals from a well one is limited in transmission systems to a relatively small selection of cables, the conductors of which are relatively high resistance, the capacity between conductors being high and the leakage resistance between conductors being not only low but variable depending upon the length of cable in the well and a number of other factors such as cable tension, amount of water soaking, etc. If attempts are made to utilize the earth itself as a transmission system, again the attenuation of the signals is high and the earth constants are known to vary with depth and with time. The same conclusions can be drawn in the transmission system utilizing the drill string as one conductor and the earth as a return path. Accordingly, prior art methods of transmitting signals the amplitude of which was modulated in accordance with a desired quantity which was being measured have been frequently unsuccessful since the amplitude of the received signals at the surface of the earth often bore little relation to the amplitude of the signals which were generated. As a result investigators have attempted to utilize frequency modulated systems in which the matter of attenuation of the signals is of secondary importance and in which the desired intelligence is obtained in the form of a change in the frequency of the signal. There is a fundamental difficulty with the frequency modulated oscillator, however, in that such wide band oscillators have a pronounced tendency to "drift" in their unmodulated frequency so that in an application such as well logging in which the oscillator frequency cannot be satisfactorily adjusted from the surface during operation, the drift of the oscillator is interpreted by the receiving instrument as a change in the quantity being measured.

I have found that it is possible to use a method of transmitting the desired information in which it is possible to correct the amplitude of an amplitude modulated electric signal for the change in amplitude of that signal due to the attenuation of the transmitting medium. In general I obtain this result by causing to be generated in the well a first set of signals the amplitude of which is proportional to the quantity to be measured, generating a second set of calibrating electric signals in the same location proportional to a substantially constant quantity, transmitting each set of signals through the transmitting medium to the receiving station, and comparing the amplitude of the first set of signals with the amplitude of the second set of signals. The amplitude of the second set of signals varies in proportion to the attenuation of the cable. Thus, for example, if the received amplitude of the second or calibration set of signals goes down to 50% of its initial value, it is apparent that the received amplitude of the first set of signals must be increased two to one. This correction step can be accomplished by making separate indications proportional to the amplitude of each set of signals, comparing these amplitudes and correcting the amplitude of the first set or by automatically obtaining the value of the first set of received signals relative to that of the second set of received signals.

It is an object of this invention to provide a method of transmitting signals through a medium of undetermined characteristics by means of which the effect of the attenuation in the amplitude of the signals due to the transmitting medium may be eliminated. It is a further object of this invention to provide such a method in which the attenuation of the transmitting medium can be determined by periodically transmitting through said transmission system a signal the initial amplitude of which is proportional to a known quantity, whereby the amplitude of the received signal is an indication of the attenuation of the transmitting medium. Another object of the invention is to provide a well logging system by means of which a desired quantity may be measured at any point in a deep bore hole and the measurement transmitted to the surface without being affected by cable leakage, variation in earth attenuation or variation of temperature in the well. Further objects and advantages of this invention will be found in this specification.

In order to facilitate understanding of the essential elements of the invention certain embodiments are illustrated in the attached drawings which form a part of this specification and are to be read in conjunction therewith. It is to be understood that the scope of the invention is not limited to the embodiments shown and described. In these drawings the same reference numeral in various figures refers to the same or a corresponding part.

Figure 1 is a diagrammatic cross section view of a well penetrating into the earth, with apparatus suitable for carrying out one embodiment of my invention;

Figure 2 is a wiring diagram partly in diagrammatic form of a second embodiment of my invention;

Figure 3 is a chart of the type obtained using the apparatus shown in Figure 2 illustrating certain relationships which are employed in carrying out this invention;

Figure 4 is a circuit diagram of another embodiment of this invention;

Figure 5 is a chart of the type obtained using the embodiment of the invention shown in Figure 4;

Figure 7:
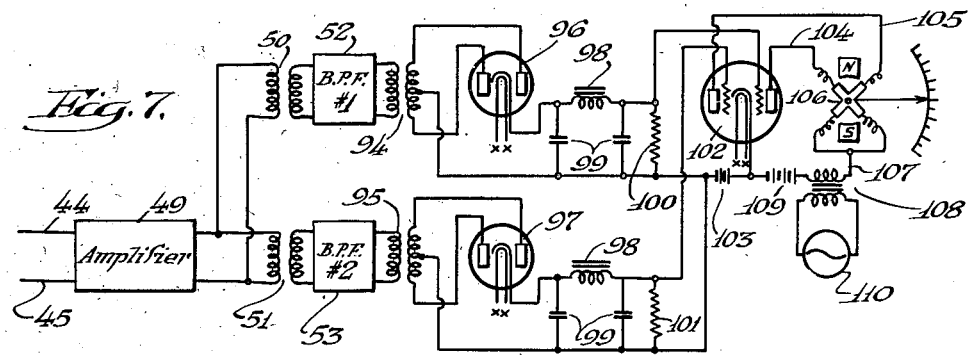
Figures 6, 7 and 8 are wiring diagrams of electrical apparatus useful at the surface in carrying out various embodiments of this invention.

In Figure 1 a well 11 is shown penetrating into the earth from the surface 12. Into this well has been lowered a pressure recording apparatus 13 involving one embodiment of my invention. The apparatus lowered into the well is enclosed within a water-tight case 14 which is preferably cylindrical in form and of such dimensions that it can be lowered into the well without difficulty. At the lower end of the case is an orifice 15. Within the case and enclosing orifice 15 is a flexible metallic bellows 16 or "Sylphon" to which is attached a disc 17. A rod 18 is attached to the disc 17 and extends upwardly into the inside of the case. A spring 19 urges the metallic bellows 16 into a collapsed position, which is opposed by the pressure exerted by the well fluids on the inside of this bellows. The vertical position of the rod 18 is therefore an indication of the pressure of the well at the point indicated. The upper end of spring 19 is held in place by a plate 20 attached firmly to the case. An electrical resistance 21 is mounted in the case 14 and suitably insulated from it. A conducting slider 22 bears upon this resistance and is attached through a non-conducting coupling 23 to the rod 18. The position of the slider 22 varies directly in proportion to the pressure of the well at the point considered. An electric oscillator 24, which may be any type of apparatus known in the art for producing alternating current signals, is mounted in the case 14 and attached across the ends of the resistance 21 producing a voltage drop across this resistance. One terminal 25 of the oscillator 24 is connected to one conductor 26 of the cable which has been used to lower the apparatus into the well. The other terminal 27 of the oscillator is attached to one contact point of a two contact relay 28. The other contact of this relay is connected through a flexible lead 29 to the slider 22 on resistance 21. The difference of potential across the oscillator which is proportional to the relatively fixed resistance 21 therefore appears between conductor 26 and one contact of the relay 28. Between the other contact and the conductor 26 there is a potential which varies directly with the position of slider 22 or resistance 21 and which is therefore proportional to the well pressure. It is apparent from this description that the resistance 21 and slider 22 form a potentiometer. Each contact in the relay 28 is alternately connected to a second conductor 30 in the cable by means of operation of relay 28. The contact arm on relay 28 is moved by means of electric current flowing through the coil of that relay caused by a battery 31. The current through the coil of relay 28 is turned on and off through an auxiliary contact 32 depending upon the position of the contact arm. The operation of the relay 28 and battery 31 is approximately the same as that which takes place in an electric door bell. By proper choice of the circuit constants and the value of the relay spring, it is possible to cause the alternate transmission of the signals to take place at a relatively low rate, for example, one variation each second. The rate at which this variation takes place is not critical but I prefer under normal conditions that it be not greater than two or three per second. The rate may be as low as several oscillations per minute depending on other factors in the transmission system. The apparatus described thus far produces alternately a first set of signals which are proportional to the pressure and a second set of electric signals proportional to the substantially constant resistance of resistance 21. These signals are transmitted through the conductors 26 and 30 of the cable to the receiving station which is near the surface of the ground 12. As they pass through these conductors they are subject to the variable attenuation in the cable due to the cable leakage. At the surface the amplitude of the received signals will be normally low due to the attenuation in the cable so that the amplitude is usually increased through amplifier 33. This amplifier can be eliminated if the amplitude of the signals reaching the surface is of satisfactory magnitude. The signals then pass through a rectifier 34 which produces a direct current varying in amplitude in accordance with the amplitude of the received signals. The direct current produced is used to actuate a recording milliammeter 35, galvanometer or other means of producing an indication proportional to the value of the current impressed upon it and are recorded on a chart 36 which is unrolled from a supply reel 37 and rolled up on a take-up reel 38.

The deflection of the recording arm of the recording milliammeter 35 will vary from a maximum value proportional to the received amplitude of the signals due to the total voltage across resistance 21, to a lesser value proportional to the voltage across the portion of resistance 21 between terminal 25 and the slider 22. The relative amplitude of these two quantities remains constant but the absolute value of each deflection is inversely proportional to the attenuation of the transmitting medium. This is illustrated roughly by the graph shown on chart 36. In the particular position of the instrument shown the amplitude of the deflection proportional to the pressure is approximately one-half that due to the total voltage applied across resistance 21. It is to be noted that the attenuation has increased from the right hand side of the chart to the left hand side which is illustrated by the fact that the maximum deflection, which is proportional to the received calibration signal during the time that the total oscillator potential is impressed on the transmission line, has decreased by a factor of approximately two to one. This may have been caused, for example, by increased water soaking of the cable or may have been due to a decrease in the output of the oscillator. Regardless of the cause of this change, it is apparent that the ratio of maximum to minimum amplitude has been preserved and that, therefore, the operator knows that the pressure has not changed during the time that the section of the chart shown was being made. Had it not been for the transmission of the second set of signals which gave the maximum indication, the operator would have been forced to interpret the results as a decrease in pressure in the left hand side of the chart relative to that on the right hand side. However, by dividing the amplitude proportional to the first signal by the amplitude proportional to the second or calibrating signal, he obtains a constant value which is entirely independent of the transmission system.

A second embodiment of this invention is shown in Figure 2. In this case only the wiring diagram is shown since the case, cable, etc. can be arranged as shown in Figure 1. In this case the invention is applied to transmitting the temperature in the well rather than the pressure. A container 39 holds a gas the pressure of which is proportional to the temperature of the container in accordance with well known gas laws. This chamber is exposed to the fluids in the well so that it can come into temperature equilibrium therewith. The container 39 includes a Bourdon spiral tube closed at the end. As the temperature of the gas changes in the container 39, the pressure applied to the Bourdon tube similarly changes and the inner end of this tube will rotate due to the expansion or contraction of the gas. A slider 40 is affixed to the end of the Bourdon tube so that it rotates in accordance with the deflection of the tube. The slider presses against a resistance 41 mounted in the case of the apparatus and insulated therefrom. A first oscillator 42 is connected across the resistance 41. This oscillator is a fixed frequency oscillator the drift of which is relatively negligible. A portion of the oscillator voltage drop across resistance 41 depending upon the position of slider 40 is coupled preferably through a band pass filter 43 tuned to pass the frequency of the oscillator 42 across two conductors 44 and 45 of a transmission line extending to the surface of the earth, for example, a cable, through condenser 46. The amplitude of this first set of signals is therefore proportional to the temperature of the gas in container 39 and hence proportional to the well temperature. A second oscillator 47 is connected across a resistance 48 mounted in the case adjacent resistance 41. (The two resistances 41 and 48 can be identical units and by mounting the resistances in this manner, temperature changes affect both resistances 41 and 48 the same.) The frequency of the second oscillator 47 is chosen to be different from but of the same order of magnitude as that of the first oscillator 42. The output of this oscillator is similarly impressed, preferably through a second band pass filter 47', across conductors 44 and 45 of the cable. By using the filters 43 and 47', the effect of changing output impedances due to shifts in the position of slider 40 on oscillator 42 are eliminated. If this effect is small, the filters can be eliminated. The cable therefore carries simultaneously two alternating current signals of different frequency, one proportional to the temperature and the other proportional to a relatively fixed quantity; namely, the resistance 48. At the receiving station these signals are amplified by amplifier 49 and impressed by coupling means such as transformers 50 and 51 across the input of two band pass filters 52 and 53. The first band pass filter 52 passes the frequency generated by the first oscillator 42 but does not pass frequency generated by the second oscillator 47. The second band pass filter passes the second set of signals due to the second oscillator 47 but rejects those due to the first oscillator 42. The output of each band pass filter which is proportional only to one of the signals impressed at the bottom of the transmission line is rectified respectively by rectifiers 54 and 55 which may be any of the rectifiers well known in the art, for example a full wave electronic rectifier. The direct current output of rectifier 54 energizes a recording milliammeter 56 or the like while the direct current output of the second rectifier 55 energizes a second similar recording milliammeter 57. The deflections of these recording instruments are recorded on a chart 58 which moves past the recording pens. The line 59 on chart 58 is proportional to the attenuated temperature signal while line 60 on chart 58 is proportional to the attenuated calibrating signal. As long as the deflection of line 60 from the zero position is constant the operator knows that the line 59 is recording the true temperature and that the results are not being affected by changes in the attenuation of the transmitting medium. This condition is shown in the section of the chart 58 given in Figure 3 to the right of A. If the deflection of line 60 decreases, the operator knows that the line attenuation has increased and he therefore must correct the temperature deflection correspondingly.

A record of the type which is obtained by the apparatus shown in Figure 2 is illustrated in Figure 3. This record is of the type obtained when the apparatus is lowered into the well and the record is preferably made as a function of the depth in any of the means now well known to the logging art. By inspection of line 60 it is seen that the attenuation of the transmission line from the right hand side of the graph up to the point marked A was substantially constant and that it increased thereby as shown by the decrease in the deflection of line 60. Accordingly, the temperature measurement line 59 must be corrected to the left of point A, i. e. increased due to the increase in the attenuation. This increase is roughly drawn in in dotted line 61. Without having recorded line 60, the operator would have observed that the temperature decreased to the left of point A, whereas actually the decrease was spurious and due only to the increase in transmission line attenuation.

In Figure 4 another embodiment of the invention is shown in which a pulsating signal is produced rather than an alternating current wave. This particular apparatus is shown adapted to the measurement of the resistivity of formations adjacent the well although it can be used if desired for the same measurements illustrated in Figures 1 and 2. The resistivity to be determined is that between electrodes 62 and 63 which are exterior to the case 14 (shown in dotted lines) and which are spaced at a sufficient distance apart so that the average current path between them lies through the formations adjacent the well. These electrodes are connected by leads 64 with the apparatus within the case 14. This apparatus essentially consists of a multi-vibrator utilizing two gas discharge tubes 65 and 66. A negative bias is applied to the grids of these tubes through a battery 67. The grids are connected to this battery through the halves of a center tapped secondary of a transformer 68, the primary of which is connected to a small alternator or oscillator 69. The plate of the gas discharge tube 65 is connected to the plate battery 70 through a circuit including the resistance 71 and the resistance between electrodes 62 and 63. The plate of the gas discharge tube 66 is connected to the battery 70 through a fixed resistance 72. The tubes are alternately fired as their grids become positive due to the action of alternator 69. Discharge of either tube stops the discharge of the other tube since a small condenser 73 is connected directly between the plates. When one tube fires a negative potential due to the charged condenser is applied to the opposite plate, thus stopping the flow of current through it. The conductors 74 and 75 in the cable are connected respectively to the electrode 63 and to the plate of gas discharge tube 66. The potential that appears across these conductors 74 and 75 reverses each time a tube extinguishes. The magnitude of the potential drop is alternately that across the electrodes 62 and 63 or that across resistance 72, depending upon whether gas discharge tube 65 or 66 is energized at the time. The drop across electrodes 62 and 63 will vary as the resistivity of the well formations vary, being low when this resistivity is low and vice versa. At the surface of the ground, conductors 74 and 75 are connected through a high resistance 76 to a recording galvanometer 77. Light from an electric lamp 78 is focused by means of lens 79 from the mirror on the galvanometer 77 forming a spot on the photosensitive recording medium 80 which is moved past the spot in accordance with the function of time or depth as desired.

The type of resultant record is shown in Figure 5. In this figure line 81 represents the zero position of the galvanometer. Deflections above this point are those obtained when gas discharge tube 66 is energized while those below the line are obtained when gas discharge tube 65 is in operation. The deflections below the line 81, therefore, are proportional to the resistivity while those above the line measure the attenuating effect of the line. Since the drop across resistance 72 is substantially constant throughout the logging operation, the deflection of line 82 above the zero axis is inversely proportional to the cable attenuation. As is shown in Figure 5, whenever the deflection decreases, as for example at points B, C and D, the attenuation of the line has increased and the deflections below the line 81 corresponding to the resistivity at such points must be increased to make up for the increased line attenuation. By this means the effect of the line is entirely eliminated.

Figure 6:
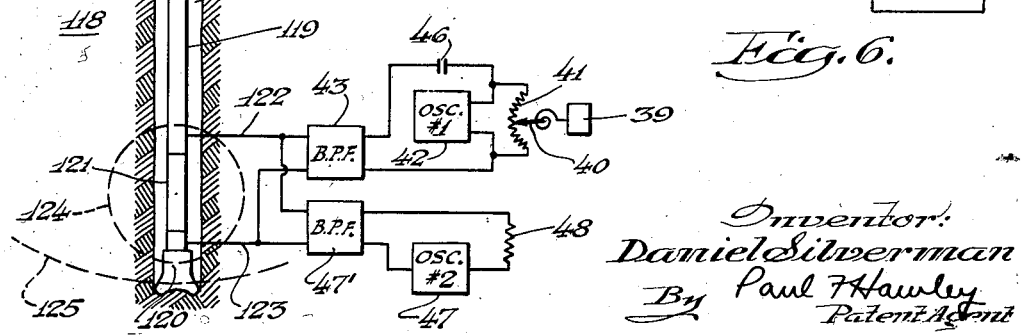

An apparatus by means of which the ratio between the desired signal and the calibrating signal can be obtained automatically is shown in Figure 6. The apparatus shown in this figure is that used at the surface of the well and it is assumed that well apparatus shown in Figure 4 is used to generate pulsating signals across conductors 74 and 75. These pulsating signals are coupled across resistances 83 and 83' to two rectifiers 84 and 85. Each rectifier is of the half wave type and can be, as shown in Figure 6, a single diode rectifying tube supplied with suitable filament potential at the points marked $x$—$x$. Current will flow through rectifier 84 only when the plate thereof is positive relative to the cathode, i. e. this rectifier is conducting only when one type of signals from the well apparatus is being received. Similarly the other rectifier 85 is conducting only when the other signals are coming from the well. Therefore, one of these rectifiers passes current proportional to the signal indicative of the measurement being made in the well while the other rectifier tube passes current proportional to the calibrating pulsating signal, the sending amplitude of which is constant and the received amplitude of which therefore measures the attenuation in the transmitting medium. The voltage output of each rectifier is filtered by means of shunt condensers 86 and series inductance 87 and applied between cathode and plate of a pentode vacuum tube, 88 and 89 respectively, each of which is preferably of the 77 type. The grids of each tube are tied together and are maintained at a positive potential by means of a battery 90. A series resistance 91 and 92, respectively, was used in each line from a rectifier to the plate of the pentode in order to limit the current through that circuit to a maximum of the order of approximately 100 microamperes. Under this condition the plate is negative with respect to the grids and exerts a retarding potential on the electrons flowing in the tube. When the electrons are collected on the plate against a retarding potential, the potential between plate and cathode varies approximately logarithmically with the current. Using the type 77 tube, the voltage between plate and cathode varies linearly with the logarithm of the plate current over a range of approximately 1000 to 1. The voltage drop between plate and cathode of pentode 88 varies logarithmically with the amplitude of the incoming signal passed by rectifier 84 within the ranges stated. The plate-cathode potential of pentode 89 similarly varies logarithmically with the amplitude of the signal obtained through rectifier 85. Accordingly, the voltage between the plates of the two tubes will be the difference of these potentials, since the cathodes are connected together, and is proportional to the logarithm of the desired signal minus the logarithm of the calibrating signal, hence is proportional to the logarithm of the ratio of these quantities. Obviously if the amplitude of the signal by means of which the attenuation is measured drops off, the plate-to-plate potential across these two tubes will change compensating for the difference in the ratio of signal to calibrating signal amplitude. The potential between the plate of the two pentodes is measured by a voltmeter 93 which may be either of the vacuum tube type or a high resistance galvanometer type. The indication of the voltmeter 93 may be either observed visually, or recorded as shown in Figure 4. In either case the resultant indication is read on a logarithmic scale. By this means the apparatus automatically compensates for the effect of any change in transmission line attenuation by measuring the ratio of the amplitude of the desired signal to the amplitude of signal which is affected only by line attenuation.

In Figure 7 a wiring diagram of another means of measuring the ratio of the desired signal to that of the calibrating signal is shown. This apparatus is particularly applicable when alternating current signals are generated by the well apparatus such, for example, as shown in Figure 2. The apparatus shown in Figure 7 can be substituted bodily for the surface apparatus shown in Figure 2. The incoming signals of two different frequencies, the amplitude of one being proportional to the quantity being measured and the amplitude of the other a measure of the line attenuation, are led into the apparatus through conductors 44 and 45 and are amplified by amplifier 49. These signals are coupled by means of transformers 50 and 51 to two band pass filters 52 and 53 which are tuned to the two different frequencies, respectively, so that the outputs of the band pass filters contain only the voltages proportional respectively to the desired signal and to the calibrating signal. These signals are coupled by means of transformers 94 and 95 to two full wave rectifiers 96 and 97 the filaments of which are supplied at points $x—x$ with suitable potential. The rectified signals are filtered by inductances 98 and shunt condensers 99 and appear across resistances 100 and 101, respectively. One end of each of these resistors is connected together. The other ends are connected to the two grids of a double triode vacuum tube 102 the filament of which is supplied with suitable potential at the points $x—x$. The common point between the two resistors 100 and 101 is connected to the cathode of vacuum tube 102 through a grid bias battery 103. The arrangement is such that the grid voltage on each grid is proportional to the amplitude of either the desired signal or of the calibrating signal as the case may be. The two plates of vacuum tube 102 are connected through leads 104 and 105 to one end of each of the two crossed coils of an alternating current ratiometer 106. The other ends of these two coils are connected together and the common lead 107 is connected in series with a transformer 108 and a plate battery 109 to cathode of vacuum tube 102. Transformer 108 is supplied with an alternating current of any desired frequency, for example 60 cycles, by an alternator 110.

The flow of current in each plate is dependent upon the plate potential and the grid voltage. The plate potential is the same on each tube and includes a direct current and alternating current component. The alternating current component is made less than the direct current component by suitable choice of the output voltage of alternator 110 since the grid voltages are proportional to the separate signals coming from the well. The alternating current component of current on one plate is proportional to the amplitude of the desired signal while that on the other plate is proportional to the amplitude of the calibrating signal. These outputs are in the same frequency and phase so that the deflection of the crossed coils of the ratiometer 106 is therefore proportional to the ratio of these two current components. Indication of this ratiometer is read opposite the scale 111 of the meter and is proportional to the ratio of amplitude of the desired signal to that of the calibrating signal. If desired, a galvanometer mirror may be mounted on the crossed coils and the indication of the ratiometer recorded photographically on a moving chart such as chart 80 shown in Figure 4. Again the end of the indicator arm of this ratiometer can be provided with a pen and a record of the deflection made on any ordinary chart such as chart 58 shown in Figure 2. Under any of these circumstances the output will be proportional to the amplitude of the measurement made in the well corrected for the attenuation of the transmission medium between the point of generation of the signals and the surface of the ground.

Figure 8:
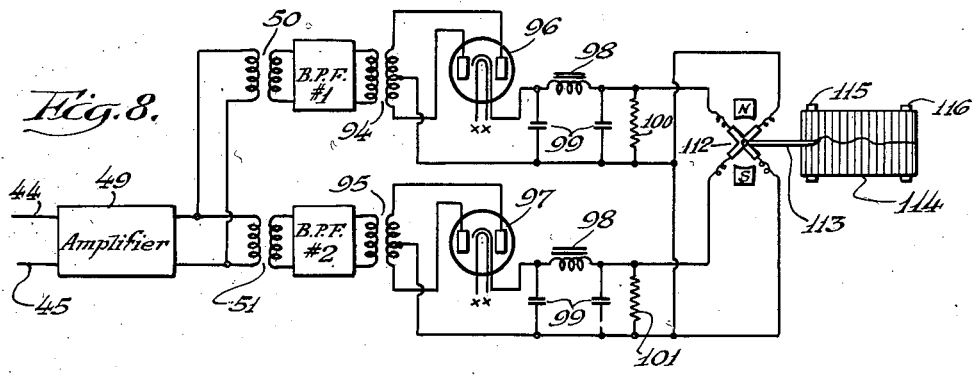

If the signal amplitudes on the output of the amplifier 49 are sufficiently great one can dispense with the vacuum tube 102 and the alternating current source 110 and associated apparatus. This is accomplished in the manner shown in Figure 8. In this figure the filtered voltage appearing across resistances 100 and 101, respectively, is applied across the two coils respectively of a ratiometer 112. The recording arm 113 of this ratiometer moves to an angular position defined by the magnetic fields due to the crossed coils and assumes a position in which the deflection of the end of this arm is proportional to the ratio of current flowing in the coils. In this figure the ratiometer is shown to be of the recording type, recording on a chart 114. This chart is unreeled from a supply reel 115 and spooled up on a take-up reel 116. The take-up reel 116 can be driven, if desired, in proportion to the rate at which the apparatus is lowered into the well in a manner now well known in the logging art. One particular device for accomplishing this result is shown, for example, in U. S. Patent 2,206,891 issued to Paul F. Hawley on July 9, 1940. It is to be understood incidentally that this same type of drive can be utilized in connection with any of the other chart recording systems shown in this application.

Figure 9:
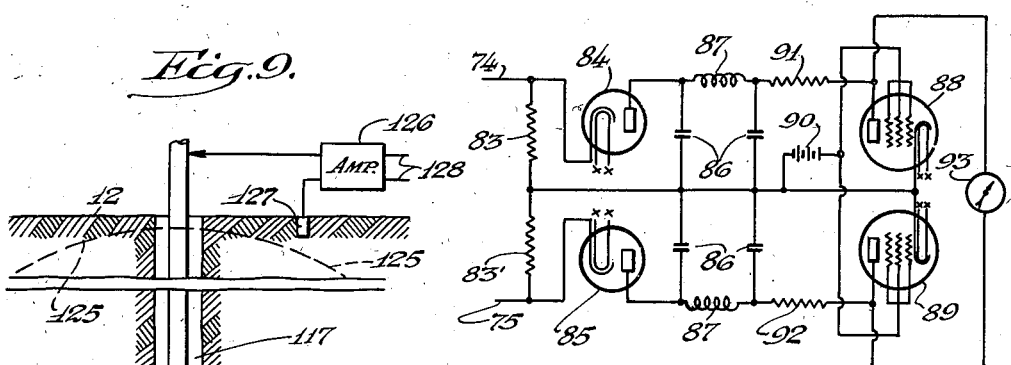
Figure 9 is a diagrammatic cross section view of a well penetrating into the earth with apparatus suitable for carrying out still another embodiment of my invention involving utilizing the earth as part of the transmitting medium.

The invention can be advantageously applied to transmitting a condition at or adjacent to a drilling bit during the time that a well is being drilled utilizing a portion of the earth itself as the return path in the transmission system. Such a system is shown in diagrammatic form in Figure 9. In this figure a well 117 has been drilled from the surface of the earth 12 penetrating, for example, formation 118. The drill pipe 119 is attached to the drill bit 120 through an insulated section 121 by means of which the drill bit 120 is electrically insulated from direct connection with the drill pipe 119. The upper end of the drill pipe 119 is shown broken but it is to be understood that it is attached to a drill rig in the customary manner. Within the insulated section 121 is mounted the apparatus for measuring a desired characteristic in the well and for producing signals for transmission to the surface of the earth. The apparatus shown in Figure 9 is similar to that shown at the left of Figure 2 and is utilized for making bottom hole temperature measurements. The container 39 is mounted adjacent the surface of the drill pipe so that it is exposed to the heat of the formations. A portion of the output of the oscillator 42, depending upon the temperature of the well, is applied through condenser 46 to the band pass filter 43, the output of which is conducted by leads 122 and 123 to the drill pipe and to the drill bit, respectively. The output of oscillator 47, which is proportional to the resistance 48, passes through the band pass filter 47' and is similarly conducted by leads 122 and 123 across the drill pipe and drill bit. Current flows in the formations of the earth due to the difference of potential between the drill pipe 119 and the bit 120. Most of this current will be concentrated in a relatively small area close to the insulated section. A path of such a current flow is shown diagrammatically by dotted lines 124. However, a small portion of the current from each oscillator follows a path 125 from the drill bit to the drill pipe 119 practically at the surface of the earth by means of which a potential gradient is produced between the well and the ground adjacent thereto. This difference of potential bears a definite relationship to the potential drop across the drill pipe and drill bit. There are two components of this drop, one due to the currents of the frequency generated by the first oscillator and the other due to that generated by the second oscillator in the drill collar. A high gain amplifier 126 is connected between a grounded electrode 127 and the drill pipe 119. The connection to the drill pipe is preferably by means of a brush bearing against a conducting portion of this drill pipe so that measurements can be made while the drill is revolving. The output from the amplifier 126 appears across the leads 128 and contains the same components as did the voltage drop between the electrode 127 and the drill pipe 119; namely, a calibrating component and a component the amplitude of which is proportional to the quantity being measured in the well. The apparatus connected across leads 128 can be identical with that shown in Figures 2, 6, 7 or 8, by means of which the amplitude of the signal generated by oscillator 42 is compared with that due to oscillator 47. Since the latter amplitude varies only in accordance with the attenuation of the earth path between the drill bit and the drill pipe; namely, path 125, it follows that the amplitude of the signal proportional to the characteristic being measured is obtained independent of the extremely variable effects of earth attenuation. This is a particularly important point since prior to my invention it has been impossible to generate amplitude modulated signals in the bottom of a well and obtain a satisfactory indication of the amplitude at the surface of the well unaffected by the attenuation of the earth.

It is to be understood that this invention is not limited to the various embodiments which have been shown or described but is best set forth by the appended claims.

I claim:

1. A method of obtaining data concerning a measurement of a characteristic quantity made in a well, including the steps of generating in said well a first pulsating electric signal the amplitude of which may vary from time to time, producing from said first signal a second signal the magnitude of which varies in relation to said first signal in accordance with the measurement of said quantity, automatically and repeatedly transmitting alternately said first and said second signals to the surface of the earth through a transmission medium the transmitting characteristics of which may be variable from time to time, the times during which each such signal is transmitted being free from control from the surface of the earth, receiving each such signal at a point near the surface of the earth, and producing separate indicia proportional respectively to the amplitude of the received first signals and the received second signals, whereby the indicia proportional to said first signals can be used to correct the amplitude of the indicia proportional to said second signals to correct for changes in magnitude of said generated first signals and for changes in the transmitting characteristics of said medium.

2. Apparatus for transmitting through a transmission medium between a point in a well and the surface of the earth information in regard to measurements made by measuring apparatus in said well, including a generator of a first pulsating electric signal, the amplitude of which may vary from time to time, means actuated by said measuring apparatus and acting on the output of said generator to produce a second set of signals the magnitude of which relative to that of said first set of signals varies in accordance with said measurements, means in the vicinity of said measuring apparatus and said generator in said well for automatically and repeatedly applying said set of signals and said second set of signals alternately to the transmitting end of said medium, said applying means being characterized by freedom of control from the surface, means at the surface for receiving said signals at the receiving end of said medium, and means responsive to said receiving means for continuously producing separate indicia proportional respectively to said first set of signals and to said second set of signals, whereby the indicia proportional to said first set of signals can be used to correct the amplitude of the indicia proportional to said second set of signals to correct for the changes in magnitude of said generated first set of signals and for changes in the transmitting characteristics of said medium.

DANIEL SILVERMAN.